US008469789B2

(12) United States Patent
Pollard et al.

(10) Patent No.: US 8,469,789 B2
(45) Date of Patent: Jun. 25, 2013

(54) GAME APPARATUS FOR COMBINED PLAY INCLUDING A FIRST PLAY AND WEB SITE PLAY

(75) Inventors: Douglas Pollard, Winnipeg (CA); Lyle Scrymgeour, Oakbank (CA); Andrew Wojtowicz, Winnipeg (CA)

(73) Assignee: Pollard Banknote Limited Partnership, Wpg, MB (CA)

( * ) Notice: Subject to any disclaimer, the term of this patent is extended or adjusted under 35 U.S.C. 154(b) by 52 days.

(21) Appl. No.: 13/304,567

(22) Filed: Nov. 25, 2011

(65) Prior Publication Data

US 2012/0123568 A1 May 17, 2012

Related U.S. Application Data

(63) Continuation-in-part of application No. 12/783,791, filed on May 20, 2010.

(60) Provisional application No. 61/180,968, filed on May 26, 2009, provisional application No. 61/451,392, filed on Mar. 10, 2011, provisional application No. 61/512,262, filed on Jul. 27, 2011, provisional application No. 61/437,444, filed on Jan. 28, 2011, provisional application No. 61/451,403, filed on Mar. 10, 2011.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................................. 463/17; 463/25; 463/42

(58) Field of Classification Search
USPC .......................... 463/1, 16–20, 25, 29, 40–42
See application file for complete search history.

(56) References Cited

U.S. PATENT DOCUMENTS

| | | | |
|---|---|---|---|
| 5,365,575 A * | 11/1994 | Katz | 379/93.13 |
| 5,772,511 A * | 6/1998 | Smeltzer | 463/17 |
| 6,824,464 B2 | 11/2004 | Wiel | |
| 7,424,617 B2 | 9/2008 | Boyd | |
| 7,788,482 B2 * | 8/2010 | Irwin, Jr. | 713/155 |
| 2001/0033689 A1 * | 10/2001 | Meder | 382/181 |
| 2001/0049305 A1 * | 12/2001 | Riendeau et al. | 463/42 |
| 2002/0090985 A1 * | 7/2002 | Tochner et al. | 463/1 |
| 2003/0045340 A1 * | 3/2003 | Roberts | 463/17 |

(Continued)

FOREIGN PATENT DOCUMENTS

JP 2008152683 A * 7/2008

*Primary Examiner* — Milap Shah
(74) *Attorney, Agent, or Firm* — Adrian D. Battison; Ade & Company Inc.

(57) ABSTRACT

A game for a plurality of players includes a set of instant win tickets and a programmed computer system creating a web site associated with the tickets to be accessed by the player to play second games. The system provides a ticket validation program for prize redemption at a retailer and provides entry of the player into the second game such that the player who is a winner of prize on the first game can select to accept the prize redemption or to enter the site to use the prize to play said at least one second game. Additional credit can be purchased and applied by a certificate or smart card to the site. The validation data base is maintained separate from the site to prevent access by the players through the site to avoid encryption.

16 Claims, 3 Drawing Sheets

U.S. PATENT DOCUMENTS

| | | | | |
|---|---|---|---|---|
| 2004/0176158 | A1* | 9/2004 | Baldwin | 463/17 |
| 2004/0204222 | A1* | 10/2004 | Roberts | 463/17 |
| 2004/0229677 | A1* | 11/2004 | Gray et al. | 463/17 |
| 2005/0164779 | A1* | 7/2005 | Okuniewicz | 463/25 |
| 2005/0197968 | A1* | 9/2005 | Das et al. | 705/64 |
| 2005/0203854 | A1* | 9/2005 | Das et al. | 705/64 |
| 2006/0025222 | A1* | 2/2006 | Sekine | 463/42 |
| 2006/0094504 | A1* | 5/2006 | Polchin | 463/36 |
| 2006/0172799 | A1* | 8/2006 | Kane et al. | 463/25 |
| 2006/0223627 | A1* | 10/2006 | Nozaki et al. | 463/20 |
| 2007/0026926 | A1* | 2/2007 | Romanik | 463/17 |
| 2007/0117609 | A1* | 5/2007 | White et al. | 463/17 |
| 2007/0218980 | A1* | 9/2007 | Pachnis et al. | 463/25 |
| 2007/0238505 | A1* | 10/2007 | Okada | 463/16 |
| 2007/0239823 | A9* | 10/2007 | Pachnis et al. | 709/203 |
| 2008/0045298 | A1* | 2/2008 | Yoshizawa | 463/17 |
| 2008/0045299 | A1 | 2/2008 | Bennett | |
| 2008/0174068 | A1 | 7/2008 | York | |
| 2008/0182561 | A1* | 7/2008 | Kim et al. | 455/414.2 |
| 2008/0220840 | A1* | 9/2008 | Katz et al. | 463/16 |
| 2009/0023490 | A1* | 1/2009 | Moshal et al. | 463/17 |
| 2009/0042631 | A1* | 2/2009 | Randhawa | 463/17 |
| 2009/0108057 | A1* | 4/2009 | Mu et al. | 235/375 |
| 2009/0149239 | A1* | 6/2009 | Youssef et al. | 463/17 |
| 2009/0197662 | A1* | 8/2009 | Wright et al. | 463/17 |
| 2009/0227320 | A1* | 9/2009 | McBride | 463/17 |
| 2009/0289764 | A1* | 11/2009 | Chiu | 340/10.1 |
| 2009/0309352 | A1* | 12/2009 | Walker et al. | 283/100 |
| 2010/0069136 | A1* | 3/2010 | Safaei et al. | 463/17 |
| 2011/0032078 | A1* | 2/2011 | Guziel et al. | 340/5.86 |
| 2011/0034229 | A1* | 2/2011 | Guziel et al. | 463/17 |
| 2011/0034230 | A1* | 2/2011 | Guziel et al. | 463/17 |
| 2011/0086692 | A1* | 4/2011 | Guziel | 463/17 |
| 2011/0105213 | A1* | 5/2011 | Irwin et al. | 463/17 |
| 2011/0169970 | A1* | 7/2011 | Wesby | 348/207.11 |
| 2012/0202571 | A1* | 8/2012 | Stanek et al. | 463/17 |
| 2012/0202572 | A1* | 8/2012 | Stanek et al. | 463/17 |
| 2013/0012286 | A1* | 1/2013 | Schuff | 463/17 |

* cited by examiner

GAME APPARATUS FOR COMBINED PLAY INCLUDING A FIRST PLAY AND WEB SITE PLAY

This application claims the benefit of priority under 35 USC 119 of Provisional Application 61/437,444 filed Jan. 28, 2011 and Provisional Application 61/451,392 filed Mar. 10, 2011 and Provisional Application 61/451,403 filed Mar. 10, 2011 and Provisional Application 61/512,262 filed Jul. 27, 2011 by the same Assignee as herein, the disclosures of which are incorporated herein by reference.

This application relates to or is a continuation in part of application Ser. No. 12/783,791 filed May 20, 2010 which corresponds to Canadian Application 2,704,075 filed May 20, 2010.

This application claims the benefit of priority under 35 USC 119 of Provisional Application 61/180,968 filed May 26, 2009.

This invention relates to game apparatus including a first play and web site play.

BACKGROUND OF THE INVENTION

The present invention is primarily concerned with a game apparatus where the first game is played on a series of instant win game tickets but can also be applied to other gaming situations by the player is awarded a first prize in a first game.

Such instant scratchoff tickets have been marketed, initially in North America and now globally, for more than 3 decades. During this period there has been significant growth in this part of the lottery marketplace and in the types of tickets that are being offered to the player.

More recently there has been rapid growth in Internet gaming, most of which is operated from locations outside of North America and is considered illegal in many jurisdictions.

Lottery organizations are now looking at the rapid growth in the unregulated gaming market in order to determine whether they can participate and provide a product that is operated in accordance with the controls in place for their other product lines. This may require changes in legislation in some jurisdictions. Other jurisdictions have developed sites which are now operational.

Traditionally instant tickets have been operated independent of other types of gaming. Players purchase tickets at a retail location, play the ticket in accordance with the rules established for that game and if the ticket is an apparent winner present it at a retailer location where the winning status is verified and the prize is paid out.

As games were developed for the instant market efforts were made to increase the play value of the games in order to provide the player more interaction rather than simply scratching the ticket to reveal a series of symbols or prize values in order to determine if the ticket is a winner.

The next stage in the development process was to introduce extended play on the internet which is linked to the instant game and provides an extension of the play value of the ticket electronically. Ingenio, a division of Loto Quebec was one of the first to offer this type of extended play value.

Another alternative is the concept of having a second chance draw for players who did not win on the instant portion.

US Published application 2008/0174068 (York) published Jul. 24, 2008 discloses a method for conducting a lottery that offers players who lose the opportunity to use their losing lottery tickets to enter one or more additional lotteries, a replay program. This proposes that the player will be awarded points which can be used in a second lottery game which can be played on line.

US Published application 2008/0045299 (Bennett) published Jul. 24, 2008 and assigned to Scientific Games discloses a system and method for providing an additional or end-of-game drawing to players of a lottery game. In one embodiment, unique validation codes provided on lottery tickets can be encrypted using an algorithm and used to create a record of such encrypted codes. A player then participates in the lottery and subsequently submits the validation code from the ticket to a lottery provider. The lottery provider applies the algorithm to the submitted validation code to create another encryption code for comparison with the record of encrypted codes. In the event a match is found, the player is entered into a second-chance or end of game drawing.

The above two patent applications relate to participation in second chance draws/lottery style play, which are entered on the internet following purchase of an instant ticket. It appears they are targeted primarily for customers, who did not win, although the losing aspect is more strongly defined in the first application. In both cases, after a player has completed the registration process on their first entry or signed in, if they are pre-registered, they are requested to enter the validation or other ticket identification number and game number as a means of identifying the ticket they are holding. With the second application, the number entered is encrypted and compared to a list of valid numbers from that game and if a match occurs the entry is accepted. For the first application, there is no mention in the claims of a comparison to a supplied list. Once the entry is accepted it is assigned points to be used in subsequent drawings. Points awarded after acceptance of the entry are based on the price of the ticket.

Also in U.S. Pat. No. 7,424,617 of Yahoo there is disclosed a points based system which employs encryption during the entry phase. Points are redeemed for purchases on-line. The example used is for bottle caps.

One of the challenges presented by the second chance draw or others forms of internet gaming is to provide secure methods that ensure that the ticket entries being made, for winning or non-winning tickets is being done in a secure manner to protect the integrity of the lottery.

The above application of Bennett explains in detail extensive use of data encryption processes to help reduce the risk. This level of control has been developed in order to achieve a perceived level of data security once control of the sequence is released to the lottery who would operate it independently of the ticket manufacturer.

In U.S. Pat. No. 6,824,464 (Wiel) issued Nov. 30, 2004 and assigned to Scientific Games is disclosed a lottery card game where the player is required by the game to go on to a second game arrangement played on line where the player plays additional games using the winning value from the first game to end up at a resultant cash value which may be zero if the second game or games are losing games, or may end up at a resultant prize value higher than the original ticket game. This cash value an be redeemed by the player at the lottery retailed by presentation of the original ticket.

SUMMARY OF THE INVENTION

It is one object of the invention to provide a lottery game apparatus which provides a first game awarding a first prize and allows the player of the first game to go on to play on a web site type game.

According to one aspect of the invention there is provided an apparatus for use in a game to be played by a plurality of players, the apparatus comprising:

a set of tickets for playing a first game by a plurality of players;

each ticket of the set of tickets being arranged on playing by the player to reveal whether each player is a loser or winner of a prize and if so the value of that prize;

and a programmed computer system;

the programmed computer system comprising:

a site associated with the tickets;

a first program for confirming whether a player is a winner of a prize of the first game and for providing a prize redemption arrangement by which the player can select to obtain the prize redemption;

a second program allowing communication with a player to enter the site from a remote terminal;

the site including at least one second game to be played by the player;

and a third program for providing entry of the player into said at least one second game on the site using said prize as at least part of a stake in the second game;

such that the player who is a winner of prize on the first game can select to accept the prize redemption or to enter the site to use the prize to play said at least one second game.

The games concerned are preferably instant win type games where the result is entirely predetermined, since such games are generally preferred in a lottery situation in order to ensure that the total winnings is predetermined. However the present invention is not limited to the type of game to be played and can include probability or other games which include game indicia covered by a scratch-off coating.

The construction may also be used in situations where the main objective is for other purposes than gambling such as in promotional games or games of fun for children or others where no gambling or prizes are involved.

Many such tickets are used directly in a lottery situation so that the tickets have no other relevance other than the playing of the lottery or game by which the player may win monetary or other prizes as part of the lottery or gaming situation.

However more attention has been recently given to the use of such tickets as promotional items used by manufacturers of other products to enhance the sale of the product.

Preferably the game data on each ticket defines an instant win game revealing whether the player is a loser or a winner of a prize and if so the value of that prize. Preferably the covering is a scratch-off layer typical with instant win tickets but it can be provided by other types of removable covering. Also the game can be other types of game such as a simple draw, a game of no prize value or even probability type games where the result is determined by the actions of the player.

Preferably the site is a web site and communication through the Internet is provided to that site. However the present invention contemplates other forms of communication and that the site has characteristics suitable for that mode of communication.

In a preferred arrangement, the apparatus for playing the first game comprises a set of lottery tickets, the set of lottery tickets comprising a substrate having printed thereon, in one or more areas, game data covered by one or more areas of scratch-off coating which can be removed by a player to expose the game data, the exposed game data including an instant win game revealing whether the player is a winner of a prize and if so the value of that prize. However other games can be used such as horse race betting or other betting which leads to the creation of a first prize which the player can choose to redeem directly as cash or to use the prize as a stake on a second game on line at a separate web site.

Preferably the third program is arranged to provide an additional incentive for the player to select to enter the web site and play the second game. The incentive can for example comprise an increase in a monetary value of the prize. However other incentives can be provided such as points in Player points club.

Preferably the control system includes a further sub program pr program component arranged to allow the player of the second game to redeem a value of the player's holdings after playing the second game or games. Typically therefore the player will play the cash either until it is gone or until the play results in a higher tier prize which makes it worthwhile to cash out.

Preferably the control system is arranged to require the player to play at least one second game before being allowed to redeem the holdings. That is, having taken the incentive to play, the player cannot merely take that extra cash incentive and run. There is a requirement for the player to play the games and thus risk the amount and bring the player under the managed risk system which controls the payout over a total number of players to a proportion of the input prize by those players. Thus the system can be funded only from the prize input without additional risk.

Thus the control system is preferably arranged such that said at least one second game is a managed risk game which provides a maximum total redemption value to a plurality of players which is a proportion only of the total of the prizes entered by those players.

Preferably the game includes a plurality of games each arranged to pay out in total to players only a proportion of a total amount staked by the players.

Preferably said at least one game comprises an accumulating jackpot game in which the jackpot paid to a winning player is a proportion of the total amount staked by the players.

In this way, the system provides another cash input opportunity for the company managing the web site. This management can be carried out by the same lottery organization managing the original game (typically the lottery ticket game) or can be carried out by a separate company set up for this operation. As the management of the web site necessarily will lead to profit due to the managed risk system, there is opportunity for the company to offer profit incentives to the lottery organization to allow this type of web site game to be added to their lottery ticket management systems.

In order for the player to cash out, the control system is preferably arranged to print a redemption certificate usable by the player at a ticket retailer for redeeming the cash value.

Preferably the control system is arranged to allow a player to purchase more credit at a ticket retailer where in the ticket retailer is arranged to operate the control system to print a credit certificate having a validation number for entering into the web site.

As an alternative cash management system, there can be provided for each player a smart card to be used by the player for credit and for redemption where the control system is arranged to enter onto the smart card information allowing the payment of credit and the redemption of holding to take place at a lottery retailer.

Preferably each ticket includes at least one validation number and wherein there is provided a data base containing a look-up-table including for each ticket said at least one validation number in association with a prize of the first game and wherein the data base for validation is accessible from lottery retailers for determining the prize and is accessible for determining the prize for the web site and wherein the data base is maintained separated from the web site to prevent direct access by players accessing the web site to the data base, thus allowing the same validation number to be used without encryption for validation of the prize in both the lottery retailer and in the web site.

Preferably the parallel redemption requires the data base to be updated in real time.

Preferably the program provides the ability for the player to redeem the holdings from the account to purchase merchandize.

Preferably the games to be played on the web site are on line instant games.

According to a second aspect of the invention there is provided an apparatus for use in a game to be played by a plurality of players, the apparatus comprising:

a set of tickets for playing a first game by a plurality of players;

each ticket of the set of tickets being arranged on playing by the player to reveal whether each player is a loser or winner of a prize and if so the value of that prize;

and a programmed computer system;

the programmed computer system comprising:

a site associated with the tickets;

the site including at least one second game to be played by the player;

wherein the programmed computer system is arranged to allow a player to purchase credit at a ticket retailer to play the second game;

and wherein the programmed computer system is arranged to print a credit certificate having a validation number for entering of the validation number into the site to access the credit.

According to a third aspect of the invention there is provided an apparatus for use in a game to be played by a plurality of players, the apparatus comprising:

a set of tickets for playing a first game by a plurality of players;

each ticket of the set of tickets being arranged on playing by the player to reveal whether each player is a loser or winner of a prize and if so the value of that prize;

and a programmed computer system;

the programmed computer system comprising:

a site associated with the tickets;

the site including at least one second game to be played by the player;

wherein there is provided a plurality of smart cards each arranged to be used by a respective player for credit and for redemption;

and wherein the programmed computer system is arranged to enter onto the smart card information allowing the payment of credit and the redemption of the value of holdings to take place at a lottery retailer.

According to a fourth aspect of the invention there is provided an apparatus for use in a game to be played by a plurality of players, the apparatus comprising:

a set of tickets for playing a first game by a plurality of players;

each ticket of the set of tickets being arranged on playing by the player to reveal whether each player is a loser or winner of a prize and if so the value of that prize;

each ticket includes at least one validation number identifying the ticket;

and a programmed computer system;

the programmed computer system comprising:

a site associated with the tickets;

the site including at least one second game to be played by the player;

wherein there is provided a data base containing a look-up-table for validation including for each ticket said at least one validation number in association with the prize of the first game;

wherein the data base for validation is accessible from lottery retailers for determining the prize;

wherein the data base for validation is accessible by the programmed computer system for determining the prize for the site;

and wherein the data base is maintained separated from the site to prevent direct access by players accessing the site to the data base, thus allowing the same validation number to be used without encryption for validation of the prize in both the lottery retailer and in the site.

The arrangement described in detail hereinafter can provide one or more of the following features and advantages:

It provides extended play option(s) for the traditional instant ticket player on the internet.

It develops a value added feature for printed lottery tickets to enhance their appeal to various market segments and player demographics.

It acts to introduce instant ticket player to web-based gaming alternatives.

It generate additional revenue using a managed-risk approach to gaming.

It acts to possibly generate additional revenue for the Lottery thru the partnership.

Basically an instant win scratchoff game is generated conventionally with a fixed, instant prize structure. The tickets are then sold to a lottery organization who market the tickets through the retailer network within their jurisdiction. Players purchase the ticket at a retailer or vending machine and play proceeds as normal. If the ticket is an apparent winner the player can redeem the ticket at a lottery retailer. At the time of redemption the winning status of the tickets is verified prior to payment. When redeemed, the lottery pays the player for the prize shown on the ticket.

Optionally the player has the opportunity to forego redeeming the ticket at a retailer and enter a web-based lottery site. At this site the player has access to at least one game format. The format for the at least one game relates to the game or ticket being redeemed on-line. Upon entering the managed-risk site, for the first time the player has to enter personal information and establish an account. The process for entry of this information is included later in this document.

Once the account is established, the player is required to enter the validation information for the ticket(s), via phone, computer or mobile device, so that the legitimacy and winning status of the ticket(s) can be verified and a check can be performed to ensure that the ticket(s) has not been redeemed previously at a conventional lottery retailer or previously used for entry into the web-based lottery site. For this purpose the redemptions systems must be run in real time to ensure there is no delay which could allow the ticket to be used twice.

Once the legitimacy and win status for the ticket has been established, the player is awarded the value of the prize shown on the ticket plus a further credit or other incentive to play on the web site. The further credit will increase the value of the prize by a percentage to be determined on an individual basis for each site. The value of the total credit is provided by the organization managing the web site game, who will subsequently be reimbursed for the original prize value of the ticket by the lottery. This organization is typically separate from the lottery and remains solely responsible for the additional credit being given.

The web site games are managed as a managed-risk concept in that the games provide a maximum total redemption value to a plurality of players which is a proportion only of the total of the prizes entered by those players. That is the total payout can never be greater than the amount of money taken in as the prize values.

This can be done by providing a plurality of games each arranged to pay out in total to players only a proportion of a total amount staked by the players.

Alternatively this can be done by providing an accumulating jackpot game in which the jackpot paid to a winning player is a proportion of the total amount staked by the players.

One of the risk factors with the managed-risk concept is that players may elect to enter the website, proceed through the registration process and acceptance in order to receive the full credit being provided, following which they could "cash out" immediately upon receipt. This of course results in a direct loss of the additional credit being provided by the separate organization managing the web site. Steps need to be undertaken to reduce this risk although it may not be possible to eliminate it completely.

Some of the alternatives discussed to reduce the risk level are as follows:

Vary the additional credit being awarded for each entry for example the range could be from $0 to $100 per instant ticket. This increases the play factor as a further inducement to participate in the on-line offering versus simple redemption at the retailer.

Introduce a minimum play requirement before a player can "cash out". For example the player may be required to participate in the on-line game offering to the equivalent value of the additional credit being awarded, for each redeemed ticket, by Pollard. If the additional credit is $5, then the player has to wager an equal amount. This may be in the form of 5-$1 entries or a combination of plays, which totals $5.

Another alternative may be the introduction of the managed-risk game offer on tickets which are deemed to be more difficult to sight validate. One possibility is that retailers will try to sight validate tickets and pay out prizes accordingly versus validating the tickets on their terminal as they are supposed to. Their objective is to collect winning tickets which they subsequently enter onto the website in order to collect the higher credit.

The proposals are consistent with steps taken to encourage Responsible Gaming. One objective of the managed risk concept is to provide an entertaining introduction to internet gaming in a safe lottery-controlled environment.

The other area of risk is in regards to the requirement for real-time reporting, particularly in regards to the redemption of winning tickets at both the retailer and the managed-risk website. The risk is that unscrupulous players and/or retailers attempt to validate the ticket and then enter on the website or vice-versa. Minimization of this risk requires the lottery or the web site organization, depending on where the first transaction takes place, being updated at the time that the transaction is completed. Any delay in the processing of this information will make the process longer. If this cannot be achieved then there have to be delays built into the website process so that we are assured that all entries are legitimate when the play action commences.

The redemption process when a player decides to "cash out" may vary depending on the lottery and any legal transactional restrictions. One option is for the web site organization to generate a redemption coupon, which contains a barcode. Simultaneously the web site organization provides the lottery with the information so that the value can be verified at the time of redemption. In operation, the player prints this coupon out and presents it to a lottery retailer for cashing. Upon receipt the lottery retailer scans the barcode and upon verification pays the amount to the player. One of the benefits of this process is that the entire entry, play and redemption process does not require the transfer of funds electronically either through a pay service, like Paypal or using credit cards.

Alternatively if the web site organization is responsible for the payout of prizes earned on the managed-risk website, they are still subject to the restrictions that the lottery is. Prizes won by the players which are less than $600 are awarded as credits to the players account. Prizes $600 and greater will have to be paid to the player directly in order to comply with existing tax regulations and other considerations that the lotteries are subject to, for example unpaid child support, unpaid taxes, etc. One question to be determined is whether if a player has won several smaller prizes the total value of which exceeds the $600 level whether the same restrictions apply at the time that the player "cashes out".

Another alternative is for the lottery to payout the prizes of $600 or greater. In turn the lottery is reimbursed by the web site organization.

The question of revenue sharing with the lotteries is to be determined. One possibility is the development of a revenue sharing system, based on a set of minimum threshold levels to ensure that the web site organization achieves its targeted profits. This system can be tailored to specific lotteries and can vary depending on the size of the market, etc. The opportunity to share revenue may provide additional incentive for the lotteries to participate jointly with the web site organization in offering this type of extended play.

Optionally, the web site organization may allow players to purchase additional credits for further play. The credit awarded is the equivalent of the monies paid with no additional credit. A portion of the value of the credits purchased could be subsequently paid to the lottery to enable them to increase their overall revenue. Lotteries are continually looking for additional revenue sources to enable them to continue and grow the level of support provided for their beneficiaries.

Various play formats on the web site games can be selected. The rationale for the managed-risk website and the awarding of the additional credit is based on the tendency of most lottery players to continue play even when they win small tier prizes, until basically all credits are used up. The overall target payout that the players extract from the managed-risk website via "cashing out" at the end of play or through the payout of prizes which exceed the $600 limit is a percentage of the value of the funds paid to the web site organization by the lottery. This percentage value is determined on an individual site basis.

To achieve this objective the challenge for the web site organization is to develop and/or implement game concepts that enable them to control prize payouts in order to ensure that the target set for the site is being achieved and maintained.

Sample game concepts which achieve this objective could be:

50/50 Draw where the game is based on the format that is popular with small fund raising activities at gatherings, sports events, etc. In this case players on the managed-risk website enters the draw by paying a set fee, e.g. the $10 win from their instant ticket, which is taken from their account. Players are not restricted from purchasing multiple tickets. At a set point in time in the future a draw is done from all eligible entrants and half of all funds raised is paid out to the winning players. This concept works if the credit being awarded by the web site organization upon completion of the verification process is less than the value of the ticket being redeemed. For example if the credit equals 50% of the winning value of the ticket then the monies paid out is 75% of the value of funds received from the lottery. The web site organization revenue equals 25% of money paid by players less operational and administrative costs for the game and web-site.

As an alternative accumulation Prizes can be provided where the managed-risk web-site offers a series of slot machine style of games which have a fixed payout for lower tier prizes and a Jackpot prize which continues to grow until paid out. For each play sequence on one or a multiple of machines, a portion of the credit paid is assigned to the Jackpot prize which continues to grow based on play activity. At some point the Jackpot is awarded based on some controlling rationale. Once the Jackpot is paid out, a minimum prize value is assigned so that there is still an incentive to play as the value of the Jackpot prize begins to accumulate again.

These play options are only representative of the types of games that could be offered to the players. There are other formats which provide the opportunity to control and/or minimize risk while still providing exciting play alternatives to lottery players.

In general the challenge for the web site organization will be to manage the risk associated with the operation of this web-site. The style of gaming presented will have to provide the appeal necessary to encourage the majority of players to commence and continue play rather than cashing out upon completion of the verification process or upon earning some low level of prizing.

The arrangement herein provides an entry method which achieves the required data security level without the need for repeated encryption and decryption processes. This is achieved by the web site organization maintaining control of the essential elements of the process and working in conjunction with the lottery to complete steps for setting up account, generate player ID or account #, verification, etc.

There are different versions of the method depending on the style of gaming being offered, that is a second chance draw or managed-risk. All versions are based on the assumption that the lotteries will not provide player information to the web site organization and the lotteries will be responsible for payment of prizes either the result of a second chance draw or when a player “cashes out” of the managed-risk site.

There may be other alternatives, for example payment of lower tier prizes to an on-line service like Paypal. These alternatives are dependent on the willingness of the lottery to provide the web site organization with access to the player information.

The arrangement described herein therefore provides a Managed Risk gaming concept, combined with a method for data entry and processing plus a method for making financial transactions relating to operation of an internet gaming site. The data entry and financial transaction methods can be used in conjunction with the Managed Risk concept to create a complete package or al of the three methods can be used independently in combination with other internet-related options.

The 3 concepts are as follows:

In regard to Data Entry, as described in the prior patent application 61/437,444, there are existing patents and applications relating to the entry and validation processes for lottery related gaming on the Internet. The application describes an alternative method related to the operation of a points-based Players Club. The present arrangement provides another alternative method by which players can enter and register on an internet website in order to establish an account. Further once the account is established to enable the player to enter applicable information relating to individual tickets or other documents that are deemed acceptable for that particular site. Once the data is entered to subsequently verify that the data entered represents a legitimate ticket and that the ticket being entered has not been redeemed previously as a conventional retail operation. The site will provide information relating to redeemed tickets to the original organizer to prevent a player from attempting to redeem the ticket conventionally after it has been entered onto the internet alternative.

The method enables a consumer to establish an account on a lottery or other organization website by mobile device, computer or phone. Registration requires the entry of personal information including identification such as a drivers license #, etc. Upon receipt the lottery will create an account for the player inclusive of account number and password, etc.

Optionally the lottery may forward all or a portion of this information to a 3rd party website in order to create an a record of the account on that site if some play action will take place there versus verification only.

Upon verification that the account has been established, to enable the consumer to enter the lottery website, access their account and to enter the validation or other verification number from a previously purchased ticket(s).

For ticket verification purposes only, the lottery website will record each entry and then forward the validation information per ticket, plus a record ID, to a third party website for verification and processing. For the lottery internal purposes, the unique record ID will link the player information and account number to the entered validation information. The third party website may be a ticket-vendor controlled website on which the validation numbers for all eligible tickets and games resides.

The third party website will have software programs which will record the entry and then proceed to verify the information The third party website sub-program will verify that the validation number that has been presented is eligible and has not been presented previously to the website. Once verification is complete the third party website will send a response to the lottery website re acceptance or rejection of the entry. The transmission will include the unique record ID for the lottery to reference.

The lottery may send a notification by e-mail, text, etc. to update player of status.

If the entry has been accepted the lottery website will provide a least one play option to the player, for example a second chance draw Optionally the third party may be responsible for operating the gaming website and the player can be offered play options there for example a second chance draw. In this case the lottery will be required to send the player account number in addition to the validation information and record ID. Upon verification the third party website may advise the player directly of acceptance or the lottery may continue to do so. This option is utilized for the Managed Risk/Alternative Redemption concept, which is operated by the third party vendor only.

Optionally several play choices could be offered to the player both including those offered under the Managed Risk/Alternative Redemption option.

In regard to the Managed Risk/Alternative Redemption, the Managed Risk concept is basically a method of operating an internet gaming site in which winners in other forms of gaming for example instant scratch tickets, lottery draw, horse race, etc can elect to enter an extended gaming website rather than redeeming their winnings at a conventional retailer of that particular product. Upon entry the site operator credits the player's account with the amount they have won initially and the site operator is subsequently credited for the amount won by the organization who offered the original product. Upon completion of the entry and verification processes, the site operator awards an additional credit to the player's account, at the site operators risk with no compensation by the organization, to the player as an incentive to enter the website rather than simply redeeming the ticket conventionally. Typically the additional award can be equal to a percentage of the winning prize but others may be considered.

The Managed Risk/Alternative Redemption concept is based on the belief that the majority of players, once they commence play will continue their play activity until either they have used up all of the monies credited to their account or else win a higher tier prize and subsequently cash-out. Overall the Managed risk website is targeting an overall payout which is less than the value of credits being received from the lottery or alternate organization. Profit for the operator basically consists of all monies received from the lottery organization minus the costs for prizes, site operation/management, development, etc.

Thus the arrangement includes establishing a lottery website which will feature at least one play option for eligible players, establishing and maintaining an individual account for each player which will track all entries, money spent, prizes won and a resulting balance.

Optionally the account may also contain information on credit cards and/or banking information depending on how financial transactions are to be handled and if the player is allowed to purchase additional credits after establishment of an account and play has begun.

Optionally the financial transactions may be handled in accordance with one of the alternative methods described below. Thus on receiving verification information on each accepted entry, the verification process will include a check on a separate data-base, which will be updated, by the lottery, in a real-time environment of all tickets which have been redeemed conventionally.

Once verification is complete providing notification to the lottery or organization, in real-time, that the player has elected to redeem a ticket at the Alternative Redemption site. This notice will also generate a request to arrange for transfer of funds equivalent to the original prize amount to the Alternative Redemption operator.

Once verification is complete, a credit is awarded to the player equal to the amount won on the original form of gaming. Also a further credit is awarded to the player as the incentive to enter the alternative website. The site offers at least one play format of gaming in which the player can elect to participate. The site can provide particular focus on game play styles which provide accumulating higher tier prizes versus guaranteed top prizes. There is also provided an arrangement to allow a player to withdraw the monies in their account upon completion of play in the form of credit on a credit card, bank deposit, credit redeemable at a lottery retailer via electronic or manual means as described in the financial section following Typically internet gaming has relied on the use of credit cards or other on-line transactional services to facilitate the transfer of funds when initiating play or for redemption of winners. The present arrangement proposes an alternative approach which does not require the need to transfer funds to or from credit cards and is more in-line with responsible gaming initiatives. There are two alternative methods which relate to the purchase of credits, either upon initial play or for subsequent play. Secondly there are two methods for redeeming prizes won on an internet site. In addition to the responsible gaming benefits these methods also solve the problem of how to include conventional retailers in Internet gaming initiatives being undertaken by the lotteries.

In a first method, the player makes a visit to a conventional lottery retail shop or other authorized location where he pays the amount of money required to purchase a credit for play on the internet. The Retailer will enter the transaction on the system. The retailers issue a slip which contains the pre-paid amount and associated transactional and verification numbers. The system maintains a record at the lottery of these transactions. After completion and acceptance of a player registration, for the first visit, or upon successful entry of account information and password, the player enters the verification number and associated amount paid onto the system. The system will verify via that the transaction had not been entered previously and secondly that the verification information is valid. Once verification is complete the appropriate amount is applied to the players account. The lottery system is updated to reflect change in status In a second method, prior to first transaction the player acts to establish an account with the lottery who will be responsible foe issuance of an account card. At a visit to a conventional lottery retail shop or other authorized location the player obtains a smart Card which will contain magnetic stripe, barcode and/or chip. The player acts to pay the amount of money required to purchase a credit for play on the internet. The retailer will scan the player cards and enter the transaction on the system. The lottery will deposit the monies into the player account. The retailer issues a receipt which contains the pre-paid amount and associated transactional and verification numbers. The system acts to maintain a record at the lottery of these transactions After completion and acceptance of a player registration, for the first visit, or upon successful entry of account information and password, the player enters their account where the money is deposited. Optionally if the gaming is being played on a third party website, the player accesses their account and requests a transfer of funds from the lottery account to their account of the third party website. Once verification is complete the appropriate amount is applied to the players account. The lottery system is updated to reflect change in status In regard to payout, then method consists of the following elements:

In a first method, the player requests to "cash-out" the remaining balance or a portion thereof from his account. The system verifies the availability of funds within the account. The system generates a record of the requested transaction including the amount to be redeemed plus verification and transactional information. The system generates a redemption slip which includes a barcode. The redemption slip is sent to player via e-mail and/or sent to mobile device. The player presents the slip or mobile device at conventional retail location or other authorized site together with other proof of ID. The retailer scans the slip or screen and enters data onto lottery system. The lottery system verifies the transaction including a check to ensure that the transaction has not been attempted previously. Payment is made by the retailer.

In the second method, the player accesses his account at the gaming website to "cash-out" the remaining balance or a portion thereof from his account. The system verifies the availability of funds within the account. The system generates a record of the requested transaction including the amount to be redeemed plus verification and transactional information. If the gaming site is a third party operation the information is transferred to the player account at the lottery. The system generates a receipt slip. The receipt slip is sent to player via e-mail and/or sent to mobile device. The player presents account card at conventional retail location or other authorized site together with other proof of ID and requests the amount to be redeemed. The retailer scans the card and the requested amount onto lottery system. The lottery system verifies the transaction including a check to ensure that the transaction has not been attempted previously. Payment is made by the retailer.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
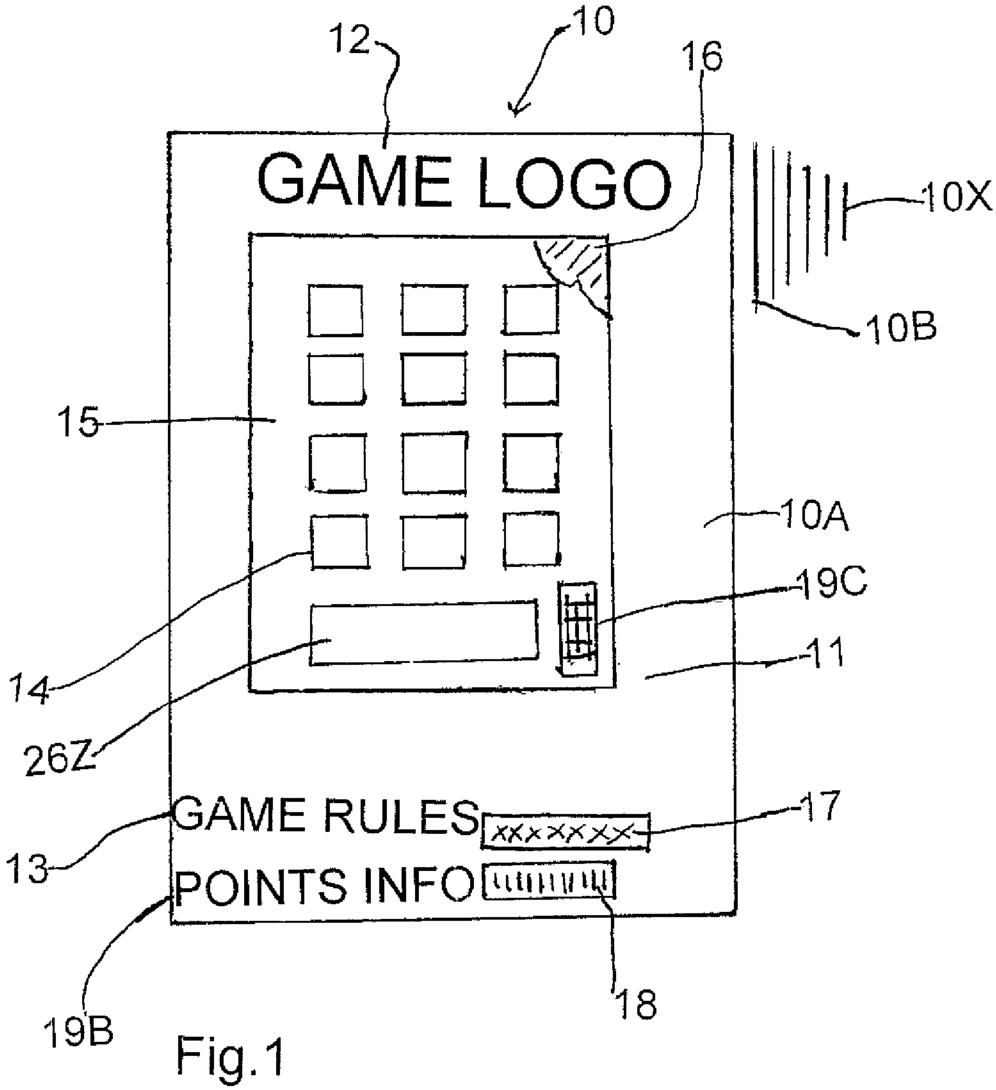
FIG. 1 is a plan view of a lottery ticket forming one part of an apparatus according to the present invention.
Figure 2:
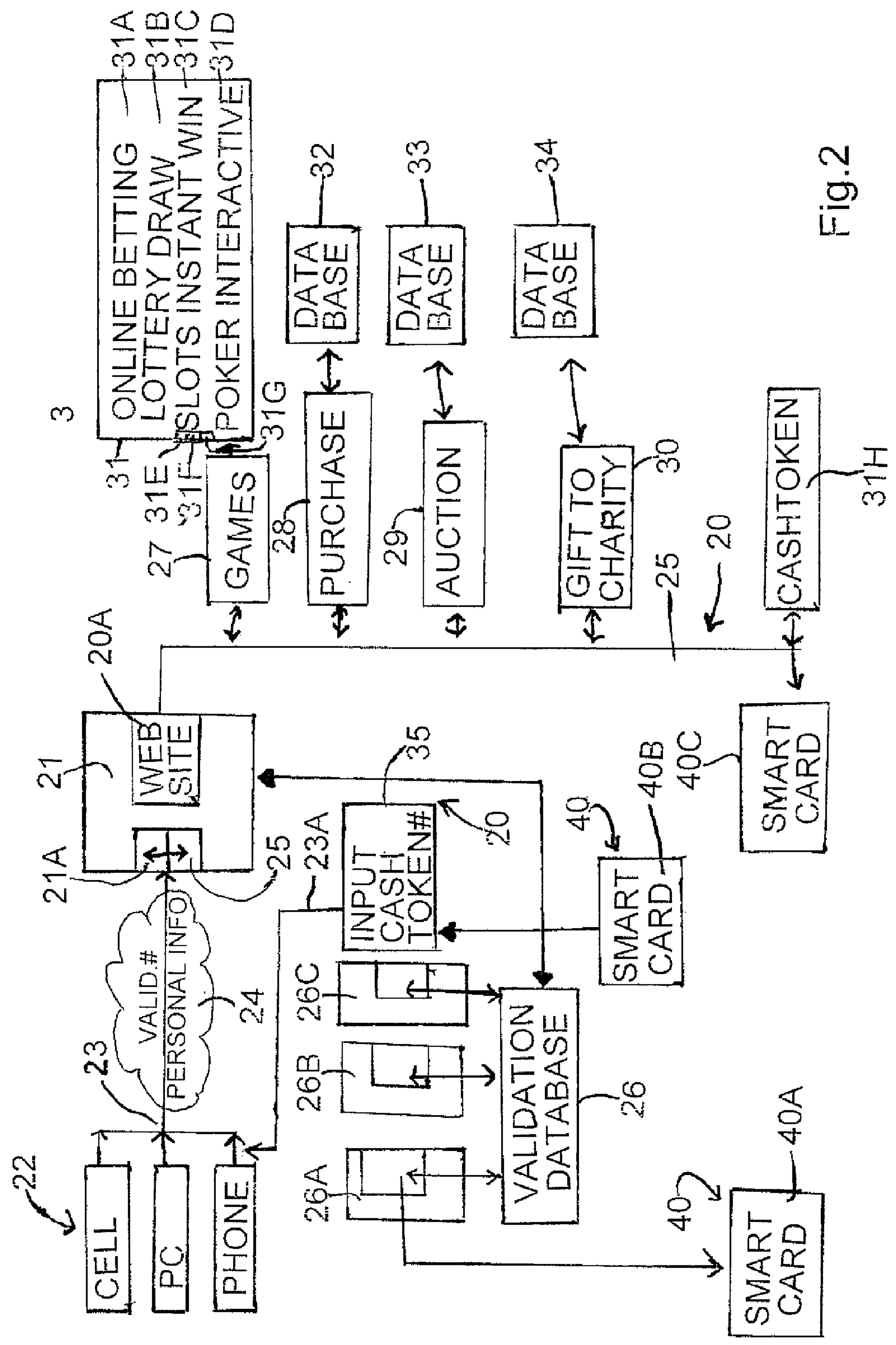
FIG. 2 is a schematic illustration of a computer system forming a second part of an apparatus according to the present invention.
Figure 3:
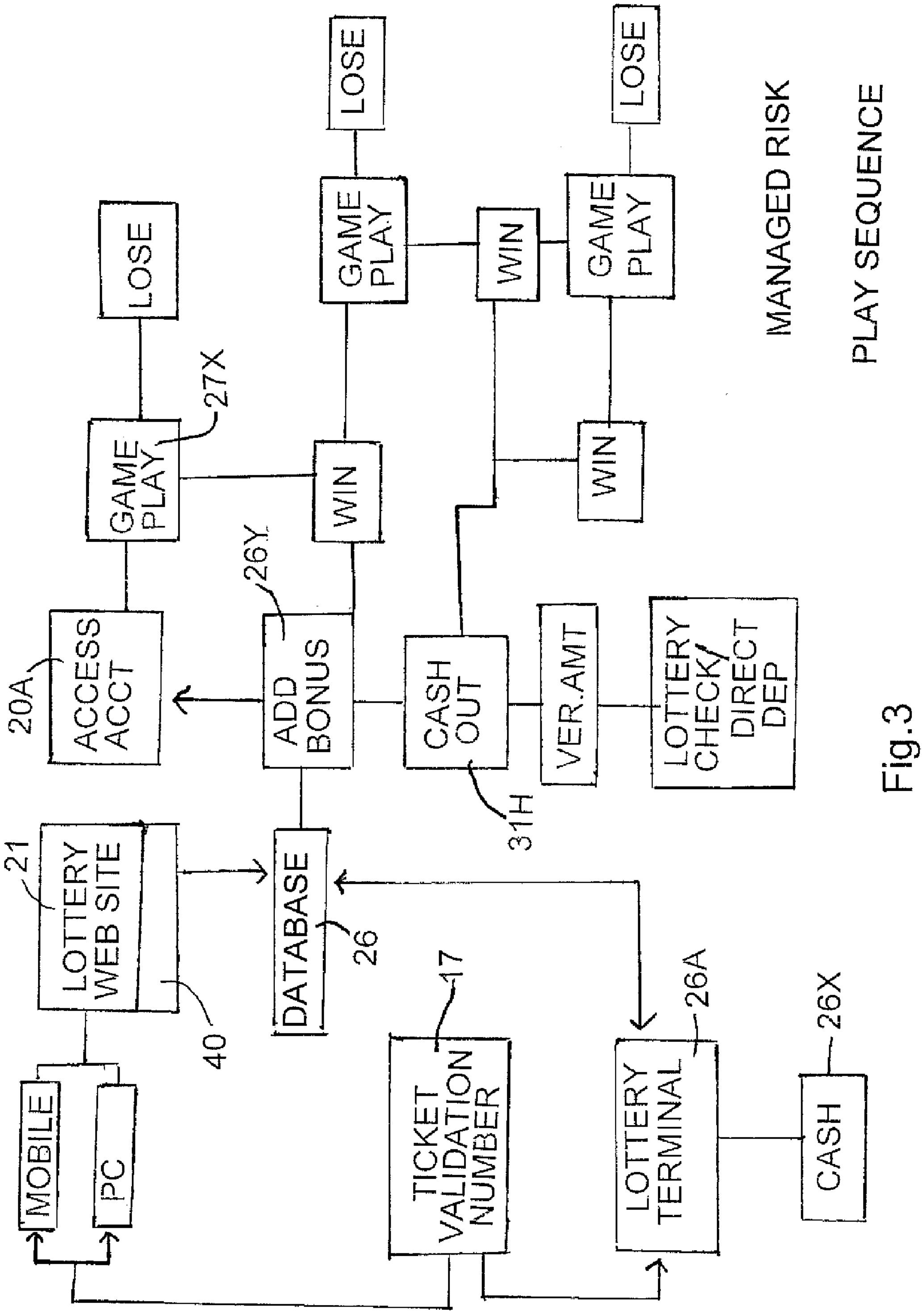
FIG. 3 is a schematic illustration of a flow chart showing operation of the apparatus of FIGS. 1 and 2 according to the present invention.

The apparatus shown in FIGS. 1 and 2 for use in a lottery game to be played by a plurality of players includes a set of lottery tickets 10 shown in FIG. 1 and a programmed computer system 20 shown in FIG. 3.

The set of lottery tickets includes a plurality of individual tickets 10A, 10B to 10X. The number of tickets can vary but typically the tickets are formed in books making up a complete set for a particular game. The books are provided as individual items to be sold by retailers to the public. Depending on the longevity of the game, the number of books can be large with many re-printings or can be much smaller for specific dedicated games.

Each ticket is formed of a substrate having printed thereon various information necessary for the game to be played. This includes a game logo 12 and game rules 13 which set out the basis by which the winning and losing status of the ticket is instantly determined from game data 14 including a level of prize for a winning ticket. Many different arrangements for such instant win tickets are well known to a person skilled in the art.

The game data 14 is printed in a game area 15 using printing techniques well known to a person skilled in the art and is covered by a scratch-off layer 16 also well known.

The ticket further includes a validation number 17 and a bar code 18 related to the validation number allowing these to be used to validate any prize claimed by a player after playing the game by exposing the game data. The bar code and validation number can be left exposed or be covered before playing by a second area of scratch-off or by the same area 16. If the barcode and validation number are exposed then the validation number is incomplete. To ensure security some of the digits from the validation number are hidden from view under scratchoff. If a barcode is hidden then it contains all of the necessary data to complete the validation process.

The game data 14 is thus covered by an areas of scratch-off coating 16 which can be removed by a player to expose the game data with the exposed game data including an instant win game revealing whether the player is a winner of a prize and if so the value of that prize.

As shown in FIG. 2, the system 20 includes a programmed computer 21 which forms a server which allows access to a web site by the player of the ticket from a terminal 22. The web site is associated with the tickets in that the validation number 17 when entered into an input 23 will allow access by the player into the web site 20A.

The computer 21 communicates through the internet 24 with a player at the remote terminal 22 wishing to enter the web site 20A.

The computer 21 includes a sub-program 21A for entering registration of personal details of a player entering the web site and for storing data identifying each player in a data base 25.

The program 21A is arranged to maintain in the data base 25 for each registered player an account of total cash holdings held by that player by adding cash won in games played by that player and deducting cash used by the player on that web site in playing the games.

The computer defines for the web site series of available locations where the player can access. These includes a plurality of games 27 to be played by the player using the cash won in the first game on the ticket. Thus the total holdings of cash for each registered player will vary as the player plays one or more games on the web site.

The web site also may define a purchase program 28 by which the player can use the cash to make purchases, an auction program by which the player may use the cash to enter an auction and a gift to charity program by which the player can use the cash to dedicate the cash value to charity. These programs are associated with data bases 31, 32, 33 and 34 respectively containing the necessary information to allow the transactions to occur. The data base 31 includes various games to be played including online betting 31A, a lottery draw 31B, slot type instant win games 31C, spin the wheel and poker type interactive games 31D.

The terminal 22 includes a further input 23A which allows a player to input a payment sum. This can be done by credit card or more preferably is done by purchasing a pre-paid card from a lottery retailer which carries a payment amount and codes which allow the payment to be processed.

In FIG. 2, the data base which carries the validation codes and the associated winning amounts, where applicable, is set up as a data base 26 separate from the web site 20A at the server 21. In this way there is no direct access between the terminals 22 of the players and the server hosting the data base 26. This data base can be accessed also from the a series of lottery validation terminals located at lottery ticket retailers 26A, 26B, 26C etc. Thus the data base 26 is only accessed from secure terminals including the web site server 21 providing no access to hackers at the terminals 22. In this way the validation numbers, while they are available when the ticket has been played, are communicated only over secure links and the full list is only available to secure terminals. In this way, there is no requirement to encrypt the validation numbers.

The apparatus disclosed herein operates as follows as shown in the flow chart of FIG. 3:

The apparatus for playing a first game by a plurality of players includes the series of tickets 10 each of which carries a validation number 17. The tickets include an instant win game which provides an apparatus for playing the first game arranged to reveal whether each player is a winner of a prize and if so the value of that prize as printed on the ticket. This information can be validated and the prize claimed at a lottery terminal which can supply the cash at 26X either by direct payout from a machine or more typically by the clerk confirming the validation and paying the cash from the till.

Thus the player of that ticket can decide to take the cash payment at the lottery terminal or can decide to play games at the web site.

At the web site a first sub-program 40 acts to confirm whether a player is a winner of a prize of the first game from the data base 26 and acts to provide access to the web site 20A associated with the game for allowing communication through the internet with a player wishing to enter the web site from a remote terminal. The web site 20A includes at least one second game 27 to be played by the player. The cash available to the player to play the game includes an added bonus 26Y which is calculated based on data provide ion the ticket at 26Z. This indicates the cash bonus the player will receive for entering the web site rather than merely cashing out at the lottery terminal. As well as or instead of a cash bonus, the player may receive other incentive to play on the web site.

Thus the system acts to confirm that the player is a winner of a prize of the first game and provides entry of the player into said at least one second game on the web site using the prize as at least part of a stake in the second game.

As shown in FIG. 3, the result of this play may be that the player immediately loses and checks out. Alternatively the player may go on to play more games (or to repeat the first game) typically until the player eventually loses all of the cash value or until the player wins a sufficiently large prize to make it worthwhile cashing out.

In this way the player who is a winner of prize on the first game can select to accept the prize redemption or to enter the web site to use the prize to play at least one second game.

The apparatus for playing the first game can comprise any type of game but typically this comprises a set of lottery tickets, the set of lottery tickets comprising a substrate having printed thereon, in one or more areas, game data covered by one or more areas of scratch-off coating which can be removed by a player to expose the game data, the exposed game data including an instant win game revealing whether the player is a winner of a prize and if so the value of that prize.

The bonus cash value acts to provide an additional incentive for the player to select to enter the web site and play the second game.

The control system includes a further sub program arranged to allow the player of the second game to redeem a value of the player's holdings after playing the second game or after playing a series of the second games.

As shown at FIG. 3, once the player has chosen to enter the web site and obtain the cash incentive, the control system is arranged to require the player to play at least one second game indicated at 27X before being allowed to redeem the holdings.

The control system controlling the games in the web site is arranged such that the second games provide is a managed risk system which provides a maximum total redemption value to a plurality of players which is a proportion only of the total of the prizes entered by those players. Such games which comprise a plurality of games each arranged to pay out in total to players only a proportion of a total amount staked by the players are known and available.

As an alternative the game 27X can comprises an accumulating jackpot game in which the jackpot paid to a winning player is a proportion of the total amount staked by the players.

As explained above, each ticket includes at least one validation number 17 and there is provided a data base 26 containing a look-up-table including for each ticket said at least one validation number in association with a prize of the first game. The data base for validation is accessible from lottery retailers for determining the prize and is accessible for determining the prize for the web site and is maintained separated from the web site to prevent direct access by players accessing the web site to the data base, thus allowing the same validation number to be used without encryption for validation of the prize in both the lottery retailer and in the web site.

The arrangement where a player can select to cash out from the ticket or to enter the web site provides a parallel redemption path. In order that the system can detect where the player has selected on option to prevent simultaneous selection of the other option, this requires the data base 26 to updated in real time to note the redemption of the ticket concerned. Thus there is direct link between lottery terminal 26A and database 26 for the validation of tickets where the player has opted to redeem at the retailer.

The program 21 provides the ability for the player to use cash from the account to purchase merchandize as indicated at program 28.

The games 31C to be played are on-line instant games.

The games 31C to be played require different cash values 31E, 31F and 31G.

The program 21C provides the ability for the player to use cash from the account to cash out by selecting a program 31H to provide a token to be printed out and redeemed at the lottery retailer.

The program 21C provides the ability for the player to use cash from the account to enter a draw 31B.

The program provides the ability for the player to use cash from the account to enter an auction using program 29.

The program provides the ability for the player to use cash from the account to give to charitable donations using program 30.

The program provides the ability for the player to enter further cash for the account. In this case, payment can be made by credit or other type of transactional card input in conventional manner.

However, the program also provides the option of entering cash by obtaining from a lottery retailer a cash input token or coupon where upon completion of the transaction the coupon can be used for entry onto the website as indicated at 35. In this case, the coupon contains a barcode or other number to facilitate the process either via a computer terminal with attached scanner or a similarly equipped mobile device.

Following are a list of possible concepts that can be used. For example the player can:

Enter the Casino

The casino offers various play formats including slot machines. There are different levels of slots available. Entry is based on pre-determined numbers of cash per play. Play action is similar to a standard slot machine and offers, free plays, accumulating credits and even cash or merchandise prizes.

Players could cash out at any time.

Lottery Draws

The player could enter into draws for various lottery items or cash/merchandise prizes. Draws cannot be related to a specific game—see note below.

Virtual Prize Wheel

The player can spin a virtual wheel for a chance to win in a variety of different prize categories. For example they could spin to multiply their accumulated cash by some factor. For example, the values on the wheel could range from 1 to 1,000.

Alternatively prizes could include a chance to win automatic entries into every 2nd chance draw conducted by the lottery for a predetermined period of time, predetermined number of draws or continuous.

Enter Auction

The auction is an auction house where players could bid to win prizes or packs being offered by the lottery. Unlike Ebay, LBay is based on a Dutch auction style in which the cash required to purchase decrement until such time as a Player agrees to pay the required cash in order to obtain the reward. Typically a multiple of the same item (i.e. 20 lottery packs) is offered and even after 1 or more units is bought at a particular cash level, the required cash continues to decline until all offered are sold or there are no takers even at the lowest amount.

If multiple bids are received at the same cash level which exceeds the number of items being offered then the earliest bids win. We may want to consider allowing for pre-bids—a player submit a bid of x well in advance of reaching that level or even in advance of the start of the auction. If the auction reaches that level then the player's bid is automatically entered. This might deflect concern that people have to have access to a computer at all times and the need to monitor the action.

Charitable Donations

Players could donate a portion of their accumulated cash to a list of charitable organizations within the state. For example charitable organizations could submit requests for support and a cost associated with the support being sought (animal shelter requesting x dog kennels at a cost of $1,000 per). The lottery assigns a cash level required to provide the items and players select an organization and donate cash accordingly.

The lottery might even consider allowing organizations (i.e. service clubs) to collect tickets or entry data (in the case of winning tickets) from it's members and to apply the cash to the items they are seeking to obtain.

Accumulate cash by Scanning Codes on Tickets with a Mobile Device/Smart Phone. Offer special promotions on select games that feature QR codes or other types of codes. Player scans the code with their mobile device for automatic access to the lottery website. Cash could be earned initially to encourage the use of this technology.

In order to cash out, the control system is arranged to print a redemption certificate usable by the player at a ticket retailer for redeeming the value.

Also the control system can be arranged to allow a player to purchase more credit at a ticket retailer and where in the ticket retailer is arranged to operate the control system to print a credit certificate having a validation number for entering into the web site.

As an alternative there can be provided a smart card 40 to be used by the player. This can be used as indicated at 40A to obtain purchased credit and from the lottery retailer and to enter such credit into the web site for play as indicated at 40B. At 400 is shown where the smart cars is used for redemption and the control system is arranged to enter onto the smart card information allowing the payment of the redemption cash to take place at a lottery retailer.

The invention claimed is:

1. A system for use by a plurality of players, the system comprising:

a set of physical game tickets for playing a first game by a plurality of players, wherein each physical game ticket of the set of physical game tickets includes a substrate having printed thereon, in one or more areas, game data covered by a covering which can be removed to expose said game data, the first game being played by one of the plurality of players to remove the covering and reveal a status of the ticket, according to the game data, which is either a losing status or a winning status associated with a monetary prize;

a website, associated with the set of physical game tickets, configured to present at least one second game associated with the set of physical game tickets; and a programmed computer system, the programmed computer system including at least one non-transitory computer-readable storage medium, having instructions stored thereon, executable by at least one processor, the instructions comprising:

a first computer program configured to confirm, for each physical game ticket, whether an associated player is a winner of the monetary prize of the first game and configured to provide a prize redemption arrangement by which the associated player can select to receive the monetary prize;

a second computer program configured to allow communication with at least one of the plurality of players to enter the website through a remote terminal; and a third computer program configured to provide entry of at least one player of the plurality of players associated with a physical game ticket of the plurality of physical game tickets having said winning status associated with said monetary prize into said at least one second game, wherein the monetary prize is used by the player as at least part of a stake for wagering in the at least one second game;

wherein, a player associated with each of the physical game tickets of the plurality of physical game tickets having a winning status associated with a monetary prize is provided the option of either (i) using said first computer program to accept the monetary prize through said prize redemption arrangement, or (ii) using said third computer program to enter the website to use said monetary prize for wagering in said at least one second game.

2. The system according to claim 1, wherein the programmed computer system includes a fourth computer program configured to enter registration of personal details of one or more players entering the website and configured to store data identifying each player.

3. The system according to claim 1, wherein the programmed computer system is configured to provide an additional incentive for the player to select option (ii).

4. The system according to claim 3, wherein the incentive comprises an increase in a value of said monetary prize.

5. The system according to claim 1, wherein the programmed computer system includes a fourth computer program configured to allow the player of the second game to redeem a value after playing the at least one second game, the value being an accumulated monetary value during play of the at least one second game.

6. The system according to claim 5, wherein the programmed computer system is configured to require the player to play at least one second game before being allowed to redeem said value.

7. The system according to claim 5, wherein the programmed computer system is configured to print a redemption certificate usable by the player to redeem said value at a ticket retailer.

8. The system according to claim 5, wherein the programmed computer system is configured to allow the player to redeem said value to purchase merchandize.

9. The system according to claim 1, wherein said at least one second game is a managed risk game which provides a maximum total redemption value to a plurality of players which is a proportion only of a total amount staked by those players.

10. The system according to claim 9, wherein said at least one second game comprises a plurality of games each arranged to pay out in total to players only a proportion of a total amount staked by the players.

11. The system according to claim 9, wherein said at least one second game comprises an accumulating jackpot game in which a jackpot amount paid to a winning player is a proportion of a total amount staked by the players.

12. The system according to claim 1, wherein the programmed computer system is configured to allow a player to purchase credit at a ticket retailer for use in wagering in said at least one second game, and wherein the programmed computer system is configured to print a credit certificate having a validation number for entering into the website.

13. The system according to claim 1, wherein there is provided a plurality of smart cards each arranged to be used by a respective player for credit and for redemption, and wherein the programmed computer system is configured to enter onto the smart card information allowing the payment of credit and the redemption of a value of holdings to take place at a lottery retailer.

14. The system according to claim 1, wherein:

each physical ticket of the plurality of physical game tickets includes at least one validation number;

a database is provided, by the programmed computer system, containing a look-up-table including for each physical ticket said at least one validation number in association with said monetary prize of the first game; and the database for validation is accessible from lottery retailers for determining the monetary prize and is accessible for determining the monetary prize for use as said stake in said at least one second game on the website; and the database is maintained separately from the website to prevent direct access to the database by players accessing the website, thus allowing the same validation number to be used without encryption for validation of the monetary prize in both the lottery retailer and in the website.

15. The system according to claim 14, wherein the database is updated in real time.

16. The system according to claim 1, wherein said at least one second game is an on-line instant game.

* * * * *